US011285929B2

(12) United States Patent
Pierfelice et al.

(10) Patent No.: US 11,285,929 B2
(45) Date of Patent: Mar. 29, 2022

(54) VEHICLES, SYSTEMS, AND METHODS FOR OPERATING A TRAILER BRAKE OUTPUT CIRCUIT ACCORDING TO A TRAILER PROFILE

(71) Applicant: Toyota Motor Engineering & Manufacturing North America, Inc., Plano, TX (US)

(72) Inventors: Jeffrey E. Pierfelice, Canton, MI (US); Frankie Reed, Ypsilanti, MI (US); Chris Conrad, Ann Arbor, MI (US); Coh Yoshizaki, Wixom, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 254 days.

(21) Appl. No.: 16/547,056

(22) Filed: Aug. 21, 2019

(65) Prior Publication Data

US 2021/0053538 A1 Feb. 25, 2021

(51) Int. Cl.
*B60T 7/20* (2006.01)
*H04N 7/18* (2006.01)
*B60T 11/10* (2006.01)
*B60W 10/192* (2012.01)
*B60T 8/172* (2006.01)

(52) U.S. Cl.
CPC .............. *B60T 7/20* (2013.01); *B60T 8/172* (2013.01); *B60T 11/108* (2013.01); *B60W 10/192* (2013.01); *B60W 2300/14* (2013.01); *B60W 2710/18* (2013.01)

(58) Field of Classification Search
CPC . B60T 7/20; B60T 8/172; B60T 8/323; B60T 8/1708; B60T 8/1887; B60T 11/108; B60R 1/003; H04N 7/181; H04N 7/183
USPC .............. 188/3 R, 3 H, 112 R; 303/3, 7, 124
See application file for complete search history.

(56) References Cited

U.S. PATENT DOCUMENTS

| 5,884,238 | A | 3/1999 | Noll et al. |
| 7,463,139 | B2* | 12/2008 | Burlak ................. B60D 1/62 |
| | | | 280/423.1 |
| 8,068,019 | B2 | 11/2011 | Bennie et al. |
| 9,037,349 | B2 | 5/2015 | Trombley et al. |
| 9,540,043 | B2 | 1/2017 | Lavoie |
| 9,854,209 | B2* | 12/2017 | Aich ............... B60W 30/18036 |
| 2013/0253814 | A1* | 9/2013 | Wirthlin ............... G01L 11/025 |
| | | | 701/124 |

(Continued)

FOREIGN PATENT DOCUMENTS

WO 2017207522 A1 12/2017

*Primary Examiner* — Christopher P Schwartz
(74) *Attorney, Agent, or Firm* — Dinsmore & Shohl LLP

(57) ABSTRACT

In an embodiment, a vehicle makes a determination, during a second ignition-on cycle of the vehicle, that a trailer brake output circuit of the vehicle was operated during a first ignition-on cycle of the vehicle preceding the second ignition-on cycle. In response to making the determination, the vehicle presents a query, via a user interface of the vehicle, whether to operate the trailer brake output circuit according to a previously-used trailer profile according to which the trailer brake output circuit was operated during the first ignition-on cycle preceding the second ignition-on cycle. The vehicle receives a reply, associated with the query, via the user interface and, in response to receiving the reply, operates the trailer brake output circuit based on the reply.

20 Claims, 7 Drawing Sheets

(56) References Cited

U.S. PATENT DOCUMENTS

| | | | |
|---|---|---|---|
| 2015/0066296 A1* | 3/2015 | Trombley | G07C 5/08 |
| | | | 701/41 |
| 2018/0109762 A1* | 4/2018 | Aich | B60R 1/003 |
| 2019/0366989 A1* | 12/2019 | James | B60T 8/323 |
| 2021/0101578 A1* | 4/2021 | Kulkarni | B60T 8/1708 |

* cited by examiner

VEHICLES, SYSTEMS, AND METHODS FOR OPERATING A TRAILER BRAKE OUTPUT CIRCUIT ACCORDING TO A TRAILER PROFILE

TECHNICAL FILED

The present disclosure generally relates to vehicles and methods carried out by vehicles, and more specifically, to vehicles and methods for operating a trailer brake output circuit according to a trailer profile.

BACKGROUND

Trailers (e.g., recreational trailers, utility trailers, boat trailers, semi-trailers, etc.) may be towed by towing vehicles (e.g., automobiles and trucks). Some trailers include trailer brakes that may be actuated by a trailer brake control electronic control unit (ECU) coupled to the towing vehicle. The trailer brake control ECU may control the trailer brakes via an electric-over-hydraulic trailer braking system or an electric trailer braking system.

An electric-over-hydraulic trailer braking system may include hydraulic trailer brakes and an electric-over-hydraulic brake actuator coupled to the trailer that receives electrical signals from the trailer brake control ECU and facilitates the application of the hydraulic trailer brakes.

An electric trailer braking system may include electric trailer brakes that are applied when the trailer brake control ECU provides an electric current to the trailer brakes. The electric trailer brakes may include brake shoes that frictionally engage a drum when activated. In some electric trailer braking systems, an electromagnet is mounted on one end of a lever in order to actuate the brake shoes. When an electric current is applied to the electromagnet, the lever is pivoted as the electromagnet is drawn against the rotating brake drum, thereby actuating the electric trailer brakes.

SUMMARY

An embodiment of the present disclosure takes the form of a method carried out by a vehicle. The method includes making a query-presentation determination during a second ignition-on cycle of a vehicle. The query-presentation determination includes a determination that a trailer brake output circuit of the vehicle was operated during a first ignition-on cycle of the vehicle preceding the second ignition-on cycle. The method further includes the vehicle, in response to making the query-presentation determination, presenting a query via a user interface of the vehicle whether to operate the trailer brake output circuit according to a previously-used trailer profile according to which the trailer brake output circuit was operated during the first ignition-on cycle preceding the second ignition-on cycle. The method additionally includes the vehicle receiving a reply via the user interface. The reply is associated with the query. The method also includes the vehicle, in response to receiving the reply, operating the trailer brake output circuit based on the received reply.

In another embodiment, a vehicle control system of a vehicle includes a user interface and an electronic control unit (ECU). The ECU includes a trailer brake output circuit, a processor, and a non-transitory computer-readable storage medium having instructions that, when executed by the processor, cause the ECU to operate the trailer brake output circuit during a first ignition-on cycle of the vehicle. The instructions further cause the ECU to make a query-presentation determination during a second ignition-on cycle of the vehicle. The first ignition-on cycle precedes the second ignition-on cycle, and the query-presentation determination includes a determination that the trailer brake output circuit was operated during the first ignition-on cycle. Additionally, the instructions cause the ECU to present, in response to making the query-presentation determination, a query via the user interface whether to operate the trailer brake output circuit according to a previously-used trailer profile according to which the trailer brake output circuit was operated during the first ignition-on cycle preceding the second ignition-on cycle. The instructions further cause the ECU to receive a reply via the user interface. The reply is associated with the query. The instructions also cause the ECU to operate the trailer brake output circuit based on the received reply in response to receiving the reply.

A further embodiment takes the form of a method carried out by a vehicle. The method includes the vehicle, during a first ignition-on cycle of the vehicle preceding a second ignition-on cycle of the vehicle, operating a trailer brake output circuit of the vehicle and setting a trailer-operation flag. During the second ignition-on cycle of the vehicle, the vehicle makes a second-ignition determination that the trailer-operation flag is set and, in response to making the second-ignition determination, presents a query via a user interface of the vehicle whether to operate the trailer brake output circuit according to a previously-used trailer profile according to which the trailer brake output circuit was operated during the first ignition-on cycle preceding the second ignition-on cycle. The method further includes the vehicle receiving a reply via the user interface and responsively operating the trailer brake output circuit based on the reply. The reply is associated with the query.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Vehicles, vehicle control systems, electronic control units (ECUs), and methods carried out by ECUs for operating a trailer brake output circuit according to a trailer profile are disclosed herein. In some embodiments, a vehicle makes a query-presentation determination during a second ignition-on cycle of the vehicle. The query-presentation determination includes a determination that a trailer brake output circuit of the vehicle was operated during a first ignition-on cycle of the vehicle preceding the second ignition-on cycle. In response to making the query-presentation determination, the vehicle presents a query via a user interface of the vehicle whether to operate the trailer brake output circuit according to a previously-used trailer profile according to which the trailer brake output circuit was operated during the first ignition-on cycle preceding the second ignition-on cycle. The vehicle receives a reply, associated with the query, via the user interface, and the vehicle operates the trailer brake output circuit based on the received reply in response to receiving the reply. By presenting a driver with a query whether to operate the trailer brake output circuit according to a previously-used trailer profile, the driver may instruct the vehicle to re-use the previously-used trailer profile, perhaps without the need to navigate a menu system (via the user interface) to select the previously-used profile from a list of one or more profiles saved to a data storage of the vehicle. Various embodiments of vehicles, vehicle control systems, ECUs, and methods carried out by ECUs for operating a trailer brake output circuit according to a trailer profile will now be described in detail with reference to the drawings.

Figure 1:
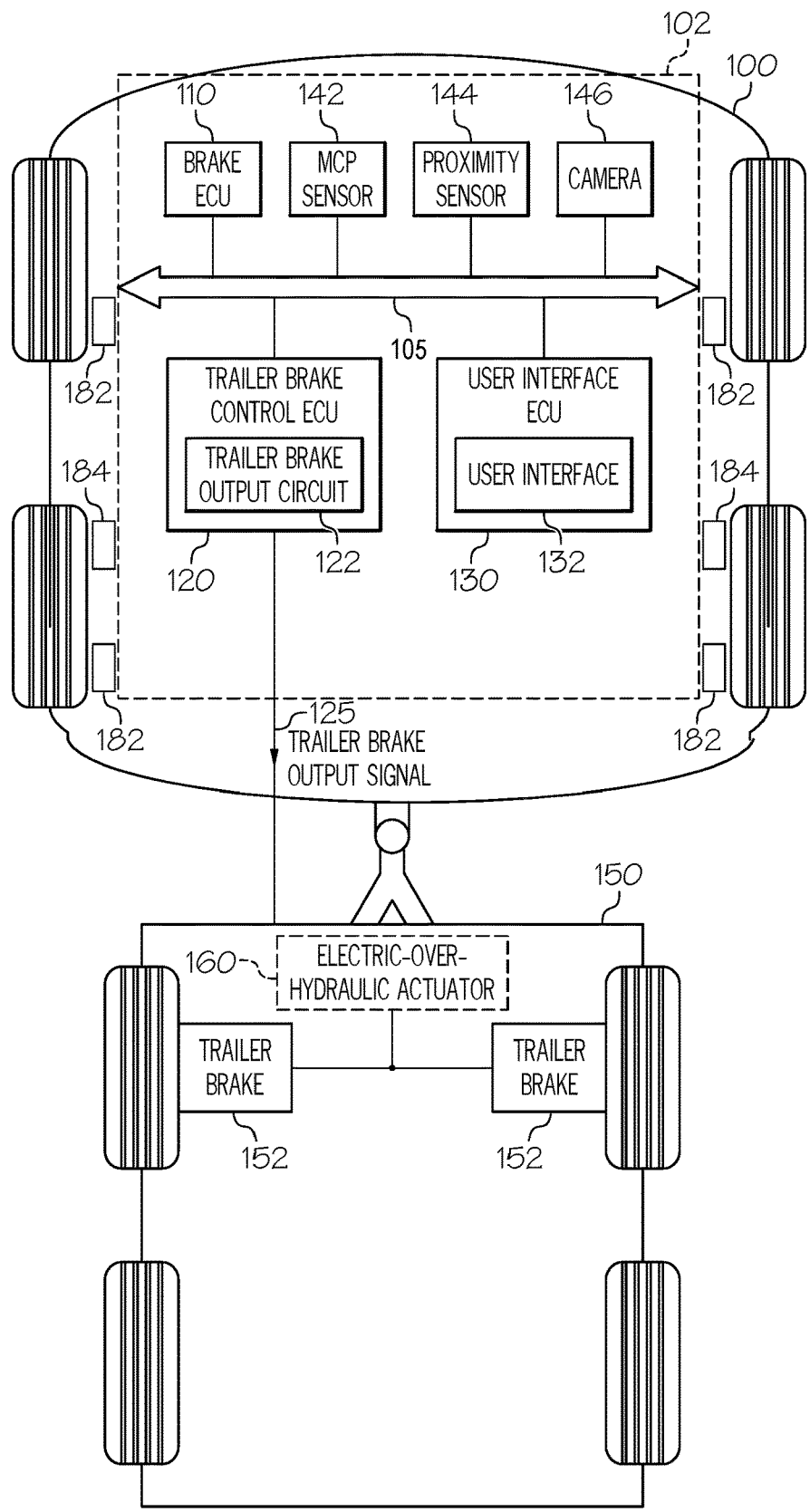
FIG. 1 depicts a towing vehicle and a trailer, according to one or more embodiments shown and described herein.

FIG. 1 depicts a towing vehicle and a trailer, according to one or more embodiments shown and described herein. As shown, a vehicle 100 is connected to a trailer 150. The vehicle 100 includes a vehicle control system 102, and could take the form of an automobile or any other passenger or non-passenger vehicle such as, for example, a tractor or a tractor truck.

System 102 includes a brake electronic control unit (ECU) 110, a trailer brake control (TBC) ECU 120, a user interface ECU 130, a master cylinder pressure (MCP) sensor 142, a proximity sensor 144, and a camera 146, each of which are communicatively connected via a communication path 105. Any of the ECUs, sensors, and/or other components of system 102 may take the form of the ECU described below with reference to FIG. 2. Those of skill in the art will appreciate that the system 102 or any component of the system 102 may include different and/or additional components without departing from the scope of the claims.

Brake ECU 110 may be configured to control a primary brake 182, an electronic parking brake 184, and/or any other brakes of the vehicle 100. The primary brake 182 may comprise actuators on one or more wheels of the vehicle 100, and may be controlled based on a master cylinder pressure measurement indicating a pressure applied to a brake pedal of the vehicle 100. The MCP sensor 142 may be configured to measure a master cylinder pressure—e.g., corresponding to a driver of the vehicle 100 pressing a brake pedal—and the brake ECU 110 may obtain the master cylinder pressure measurement from the MCP sensor 142. The electronic parking brake 184 may control actuators on one or more wheels of the vehicle 100, and could take the form of a pull-cable brake system, for example.

TBC ECU 120 may be configured to receive input from other ECUs (e.g., brake ECU 110 and/or user interface ECU 130), MCP sensor 142, proximity sensor 144, camera 146, and/or any combination of these or other components, and to output a trailer brake output signal 125—for example, a pulse-width modulation signal, based on the received input. In the embodiment shown in FIG. 1, the TBC ECU 120 includes a trailer brake output circuit 122, which may output the trailer brake output signal 125 via the trailer brake output circuit 122. The trailer brake output circuit 122 may include one or more electrical components, such as resistors, capacitors, transistors, inductors, and the like. In some embodiments, the trailer brake output circuit 122 may include at least one power transistor, such as a MOSFET transistor.

Trailer brake output signal 125 may take the form of a voltage or current, directly to the plurality of trailer brakes 152 via the trailer brake output circuit 122 (in embodiments in which the trailer 150 employs an electric braking system) or to the electric-over-hydraulic actuator 160 (in embodiments in which the trailer 150 employs an electric-over-hydraulic braking system) using the conductive medium. In some embodiments, the trailer brake output circuit 122 may supply current from the power system of the vehicle 100.

In some embodiments, the trailer brake output signal 125 takes the form of a pulse-width modulation signal, among other possibilities. For instance, in some embodiments, the trailer brake output circuit 122 outputs a trailer brake output signal in response to receiving a pulse-width modulated trailer brake output command signal having a duty cycle. In such embodiments, the trailer brake output circuit 122 may generate the trailer brake output signal in proportion to the duty cycle of the pulse-width modulated trailer brake output command signal. However, it should be understood that in other embodiments, the trailer brake output circuit 122 may output the trailer brake output signal in response to a trailer brake output command signal having a waveform other than a pulse-width modulated waveform.

User interface ECU 130 may be any component capable of carrying out the user-interface functions described herein, and could be configured to output information to a user (such as a driver or passenger) and/or receive input from the user. For instance, the user interface ECU 130 may present output received from another ECU of system 102, such as brake ECU 110 and/or TBC ECU 120. Additionally, the user interface ECU 130 may be configured to provide received input to one or more ECUs of system 102. User interface ECU 130 may include a user interface 132, and the user interface ECU may present output to a user via the user interface and/or receive input from the user via the user interface. Output could be provided via a touchscreen display, a loud speaker, and/or any other component integrated with and/or communicatively connected to the user interface. Additionally, input might be achieved via the touchscreen display, one or more buttons, a microphone, and/or any other component integrated with and/or communicatively connected to the user interface. Some components may provide for both input and output, such as the aforementioned touchscreen display. Those having skill in the art will understand that user interface 132 could take other forms as well.

Proximity sensor 144 and camera 146 could take the form of one or more sensors operable to perform any of the proximity-sensor and/or imaging functions described herein, respectively, and could be positioned on an interior and/or exterior of vehicle 100. For instance, proximity sensor 144 may be operable to detect the presence of a trailer in proximity to the rear of vehicle 100, and could include a radar sensor, a lidar sensor, or any combination of these or other proximity sensors. The radar sensor or lidar sensor may obtain signals (such as electromagnetic radiation) that can be used by system 102 (or an ECU of the system) to obtain information regarding a surrounding environment of vehicle 100. For example, the radar sensor and/or lidar sensor may send a signal (such as pulsed laser light or radio waves) and may obtain a distance measurement from the sensor to the surface of a road agent or other object based on a time of flight of the signal—that is, the time between when the signal is sent and when the reflected signal (reflected by the object surface) is received by the sensor. Camera 146 may collect light or other electromagnetic radiation and may generate an image representing an environment of the towing vehicle, such as an image a rear of the towing vehicle (perhaps from the perspective of the towing vehicle). Though proximity sensor 144 and/or camera 146 may be referenced in the singular throughout this disclosure, those of skill in the art will appreciate that vehicle 100 may include multiple proximity sensors and cameras.

The communication path 105 may be formed from any medium that is capable of transmitting a signal such as conductive wires, conductive traces, or optical waveguides, among other examples. Moreover, the communication path 105 may be formed from a combination of mediums capable of transmitting signals. In one embodiment, the communication path 105 comprises a combination of conductive traces, conductive wires, connectors, and buses that cooperate to permit the transmission of electrical data signals to components such as processors, memories, sensors, input devices, output devices, and communication devices. Accordingly, the communication path 105 may comprise a vehicle bus, such as a Local Interconnect Network (LIN) bus, a Controller Area Network (CAN) bus, a Vehicle Area Network (VAN) bus, or any combination of these or other communication paths. Additionally, it is noted that the term "signal" means a waveform (e.g., electrical, optical, magnetic, mechanical or electromagnetic), such as DC, AC, sinusoidal-wave, triangular-wave, square-wave, vibration, etc., capable of traveling through a medium. The communication path 105 communicatively couples the various components of the system 102. As used herein, the term "communicatively coupled" means that coupled components are capable of exchanging data signals with one another such as, for example, electrical signals via conductive medium, electromagnetic signals via air, optical signals via optical waveguides, etc.

The trailer 150 may be an unpowered vehicle that includes one or more wheels and that is capable of being pulled by the vehicle 100. The trailer 150 could take the form of, for example, a recreational trailer, a utility trailer, a boat trailer, or a semi-trailer, among other possibilities. As depicted in FIG. 1, trailer 150 includes a plurality of trailer brakes 152, which in the illustrated embodiment includes two trailer brakes, one coupled to each wheel of the front axle. However, it should be understood that in other embodiments, the plurality of trailer brakes 152 may include more than two trailer brakes, such as in embodiments in which the plurality of trailer brakes 152 includes multiple axles with two trailer brakes associated with each axle. In some embodiments in which the trailer 150 employs an electric-over-hydraulic braking system, the plurality of trailer brakes 152 may be a plurality of hydraulic trailer brakes and the trailer 150 may include an electric-over-hydraulic actuator 160 that receives an electrical activation signal from the system 102 and transforms the received electrical activation signal to a hydraulic pressure that activates the plurality of hydraulic trailer brakes, as will be described in further detail below. In embodiments in which the trailer 150 employs an electric braking system, the plurality of trailer brakes 152 may be a plurality of electric trailer brakes and the trailer 150 may not include the electric-over-hydraulic actuator 160.

In embodiments in which the trailer 150 employs an electric trailer braking system, the TBC ECU 120 is electrically coupled to the plurality of trailer brakes 152 via the trailer brake output circuit 122 using a conductive medium, such as a conductive wire. In embodiments in which the trailer 150 employs an electric-over-hydraulic braking system, the TBC ECU 120 is electrically coupled to the electric-over-hydraulic actuator 160 via the trailer brake output circuit 122 using a conductive medium, such as a conductive wire.

It should be understood that, while various ECUs of system 102 are described as being configured to perform various operations, other ECUs of the system 102 may perform these operations. Further, the operations of multiple ECUs could instead be carried out by a single ECU, and the operations performed by a given ECU could instead be carried out by multiple ECUs.

Figure 2:
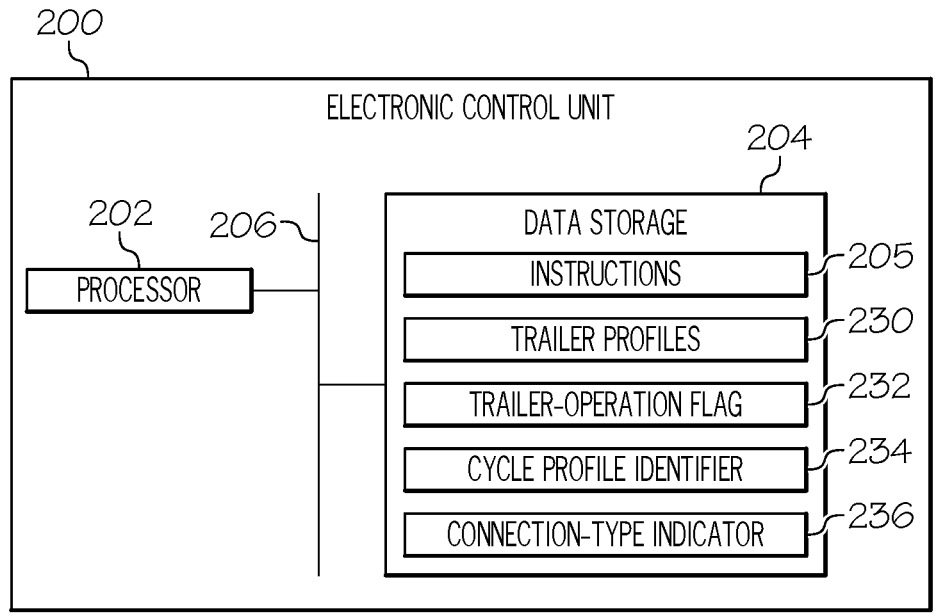
FIG. 2 depicts a block diagram of an ECU, according to one or more embodiments described and illustrated herein.

FIG. 2 depicts a block diagram of an ECU, according to one or more embodiments described and illustrated herein. As shown, an ECU 200 includes a processor 202 and a data storage 204 including instructions 205, which are communicatively connected via a system bus 206. Any of brake ECU 110, TBC ECU 120, user interface ECU 130, MCP sensor 142, proximity sensor 144, camera 146, or any combination of these or other components of system 102 could take the form of (or include) ECU 200. It should be understood that ECU 200 may include different and/or additional components, and some or all of the functions of a given component could instead be carried out by one or more different components. For instance, an ECU (such as TBC ECU 120) could include a trailer brake output circuit. As another example, an ECU (such as user interface ECU 130) could include a display. Additionally, ECU 200 could take the form of (or include) a plurality of ECUs, and some or all of the functions of a given component could be carried out by any combination of one or more of the ECUs in the plurality.

Processor 202 may take the form of one or more general-purpose processors and/or one or more special-purpose processors, and may be integrated in whole or in part with data storage 204 and/or any other component of ECU 200, as examples. Accordingly, processor 202 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 204 may take the form of a non-transitory computer-readable storage medium such as a hard drive, a solid-state drive, an erasable programmable read-only memory (EPROM), any other non-volatile or other storage, or any combination of these, to name just a few examples.

Instructions 205 may be stored in data storage 204, and may include machine-language instructions executable by processor 202 to cause ECU 200 to perform the computing-device functions described herein. Additionally or alternatively, instructions 205 may include script instructions executable by a script interpreter configured to cause processor 202 and ECU 200 200 to execute the instructions specified in the script instructions. In an embodiment, the instructions include instructions executable by the processor to cause the ECU to execute a neural network. Those having skill in the art will recognize that instructions 205 may take other forms as well.

As shown, additional data may be stored in data storage 204, such as a one or more trailer profiles 230, a trailer-operation flag 232, a cycle profile identifier 234, and a connection-type indicator 236, as will be described in further detail below. The additional data such as the could be stored as a table, a flat file, data in a filesystem of the data storage, a heap file, a B+ tree, a hash table, a hash bucket, or any combination of these, as examples.

System bus 206 may be any component capable of performing the system-bus functions described herein. In an embodiment, the system bus is any component configured to transfer data between processor 202, data storage 204, and/or any other component of ECU 200. In an embodiment, the system bus includes a traditional bus as is known in the art. In other embodiments, the system bus includes a serial RS-232 communication link, a USB communication link, and/or an Ethernet communication link, alone or in combination with a traditional computer bus, among numerous other possibilities. In some examples, the system bus may be formed from any medium that is capable of transmitting a signal, such as conductive wires, conductive traces, or optical waveguides, among other possibilities. Moreover, the system bus may be formed from a combination of mediums capable of transmitting signals. The system bus could take the form of (or include) a vehicle bus, such as a local interconnect network (LIN) bus, a controller area network (CAN) bus, a vehicle area network (VAN) bus, or any combination of these or mediums. Those of skill in the art will recognize that system bus 206 may take various other forms as well.

Figure 3:
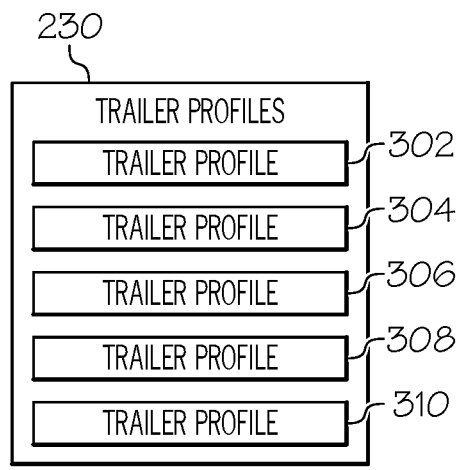
FIG. 3 depicts trailer profiles stored in a data storage, according to one or more embodiments described and illustrated herein.

FIG. 3 depicts trailer profiles stored in a data storage, according to one or more embodiments described and illustrated herein. As shown, the one or more trailer profiles 230 stored in data storage 204 includes trailer profiles 302, 304, 306, 308, and 310. A given trailer profile could include properties of trailer 150 or another trailer, such as the length, width, high type, number of axles, and/or trailer brake type, among other possibilities. System 102, TBC ECU 120, and/or another ECU or component of system 102 may operate trailer brake output circuit 122 according to any one or more of trailer profiles 302 to 310 and/or any other trailer profiles. Additional details regarding the trailer profiles is provided below.

Figure 4:
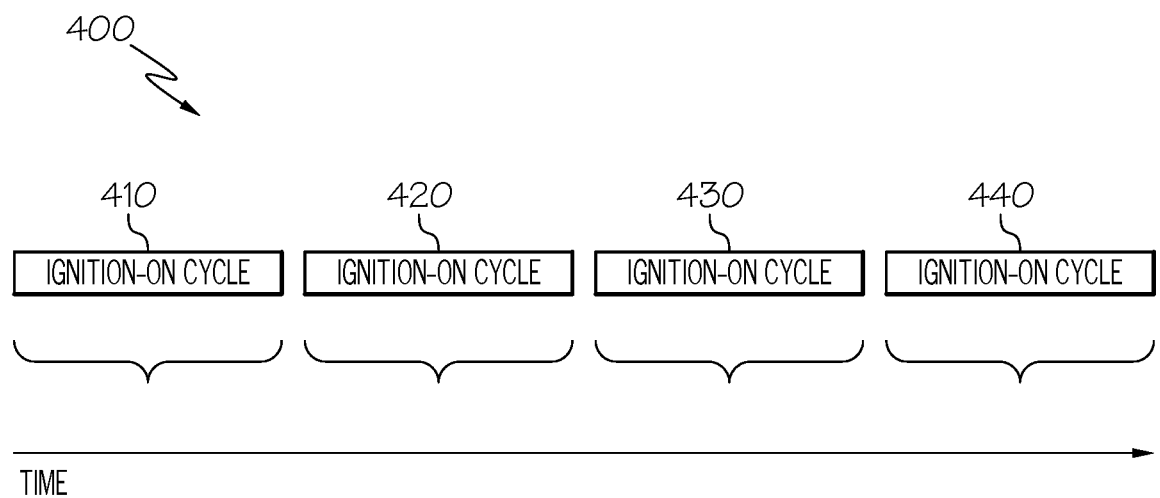
FIG. 4 depicts several ignition-on cycles of a vehicle, according to one or more embodiments described and illustrated herein.

FIG. 4 depicts several ignition-on cycles of a vehicle, according to one or more embodiments described and illustrated herein. As shown, ignition-on cycles 400 of vehicle 100 include ignition-on cycles 410, 420, 430, and 440 over a given period of time. An ignition-on cycle may begin at an ignition-on of the vehicle, for instance, and could end at an ignition-off of a vehicle, among other examples. Those of skill in the art will realize that ignition-on cycles 400 of vehicle 100 may include additional and/or difference ignition-on cycles, such as one or more ignition cycles before, after, or between the ignition cycles shown in FIG. 4.

In an embodiment, a preceding ignition-on cycle is an immediately-preceding ignition-on cycle such that no ignition-on cycle occurs between a given ignition-on cycle and the preceding ignition cycle. For example, in the embodiment illustrated in FIG. 4, ignition-on cycle 420 precedes ignition-on cycle 430 because no ignition-on cycles occur between ignition-on cycles 420 and 430. Additionally, ignition-on cycle 430 precedes ignition-on cycle 440 because no ignition-on cycles occur between ignition-on cycles 430 and 440. A given ignition-on cycle precedes no more than one other ignition-on cycle, and a given ignition-on cycle has no more than one preceding ignition-on cycle.

In an embodiment, a prior ignition-on cycle is an ignition-on cycle that occurs before a given ignition-on cycle, but is not necessarily an ignition-on cycle preceding the given ignition-on cycle. For example, in the embodiment illustrated in FIG. 4, ignition-on cycle 410 is prior to ignition-on cycle 430 because it occurs before ignition-on cycle 430. However, ignition-on cycle 410 does not precede ignition-on cycle 430 because ignition-on cycle 420 occurs between ignition-on cycles 410 and 430. Ignition-on cycle 420 is also prior to ignition-on cycle 430 (because it occurs before ignition-on cycle 430), and also precedes ignition-on cycle 430 (because no ignition-on cycles occur between ignition-on cycles 420 and 430).

With reference again to FIGS. 1 and 2, vehicle 100 may make a determination that a trailer (such as trailer 150) is coupled to vehicle 100. Making such a determination may include making a determination that trailer brake output circuit 122 is electrically coupled to trailer brakes 152 of trailer 150. The vehicle 100 could also determine a connection type between trailer brake output circuit 122 and trailer brakes of a trailer coupled to vehicle 100. The connection type could take the form of (or include), for instance, a 4-pin connection type, a 7-pin connection type, and/or any other connection type. As an example, making a determination that a trailer is coupled to vehicle 100 may include making a determination that the trailer brake output circuit is electrically coupled to trailer brakes via a 7-pin connection.

As another possibility, determining that a trailer is coupled to the vehicle could include using proximity sensor 144 to determine whether a trailer is present at a rear of vehicle 100. For instance, vehicle 100 may include a trailer hitch, and proximity sensor 144 could be positioned near the trailer hitch to determine whether a trailer is in proximity to the trailer hitch. As a further possibility, determining that a trailer is coupled to the vehicle could include using a camera 146 to determine whether a trailer is present. For instance, camera 146 may capture a rearward image of the vehicle, and the vehicle may determine that a trailer is coupled to the vehicle based on the captured image. As an example, vehicle 100 may perform an analysis of the captured image and make the determination based on the analysis.

Numerous other examples of making a determination that a trailer is coupled to vehicle 100 are also possible, and presenting the request for a trailer in response to making the determination could take other forms as well.

Vehicle 100 may store connection-type indicator 236 that indicates a connection type between trailer brake output circuit 122 and trailer brakes of a trailer coupled to vehicle 100. In an embodiment, connection-type indicator 226 takes the form of an identifier associated with a connection type from among a plurality of connection types. The connection-type indicator could take the form of a string value or a numeric value associated with a given connection type, as examples. If vehicle 100 makes a determination that a trailer is not coupled to the vehicle, then the connection-type indicator could take the form of FALSE or NO CONNECTION values, among other possibilities.

In another embodiment, connection-type indicator 226 takes the form of an indicator of a respective contention type. For instance, the connection-type indicator could take the form of a 7-pin-connection flag (e.g., a Boolean value) that indicates whether or not the connection type is a 7-pin connection. If vehicle 100 determines that trailer brake output circuit 122 is electrically coupled to trailer brakes of a trailer via a 7-pin connection, then storing the connection-type indicator could include setting the 7-pin-connection flag. Conversely, if the vehicle determines that the trailer brake output circuit is not electrically coupled to trailer brakes via a 7-pin connection, then storing the connection-type indicator could include unsetting the 7-pin-connection flag.

Referring to FIGS. 3 and 4, during an ignition-on cycle, vehicle 100 may operate trailer brake output circuit 122 according to a given trailer profile. For instance, during ignition-on cycle 410, the vehicle could operate the trailer brake output circuit according to trailer profile 302. Additionally, during ignition-on cycle 420, the vehicle could operate the trailer brake circuit according to the same trailer profile 302 or a different trailer profile such as trailer profile 304. In some embodiments, the vehicle does not operate the trailer brake output circuit during an ignition-on cycle.

Operating trailer brake output circuit 122 according to a trailer profile during an ignition-on cycle may include setting trailer-operation flag 232. For instance, the trailer-operation flag could take the form of a Boolean value, and operating trailer brake output circuit 122 according to any trailer profile during an ignition-on cycle may include setting trailer-operation flag 232 to TRUE. If vehicle 100 does not operate the trailer brake output circuit during an ignition-on cycle, then vehicle 100 may unset the trailer-operation flag.

Operating trailer brake output circuit 122 according to a given trailer profile during an ignition-on cycle may include storing cycle profile identifier 326 that identifies the given trailer profile. For instance, if vehicle 100 operates the trailer brake output circuit according to trailer profile 302 during ignition-on cycle 410, then the vehicle may store an identifier of trailer profile 302 to a data storage of the vehicle (such as data storage 204 of TBC ECU 120) as cycle profile identifier 326. If vehicle 100 does not operate the trailer brake output circuit during an ignition-on cycle, then vehicle 100 may store a value of NONE as the cycle profile identifier, as just one example.

Figure 5:
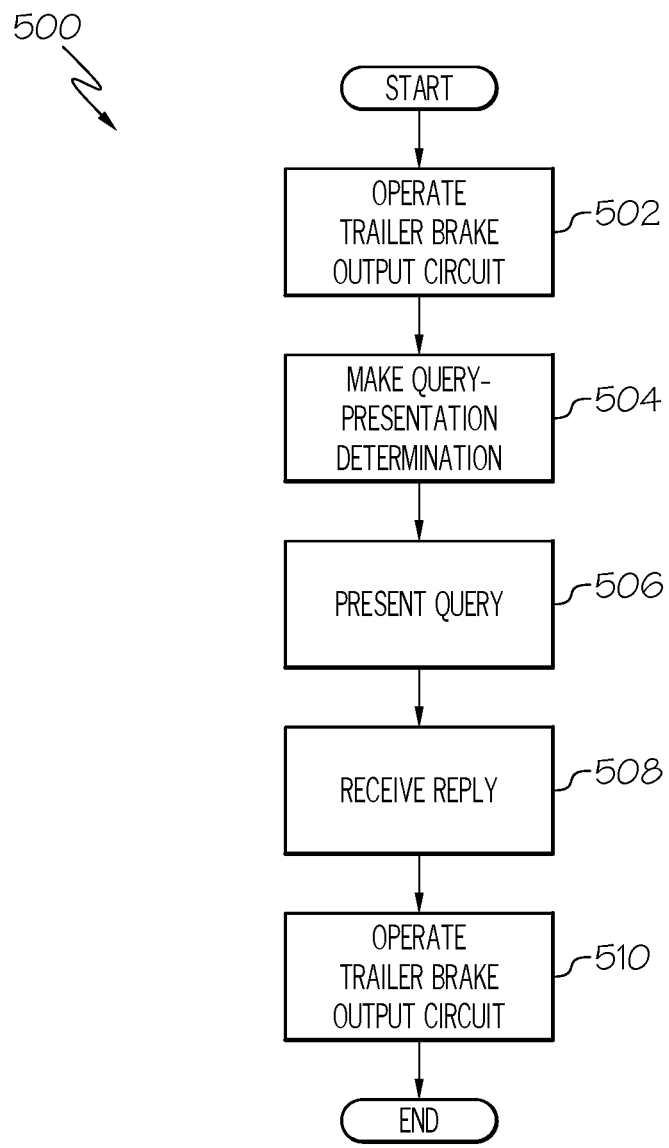
FIG. 5 depicts a flowchart of a method, according to one or more embodiments described and illustrated herein.

FIG. 5 depicts a flowchart of a method, according to one or more embodiments described and illustrated herein. Though the method is described as being carried out by vehicle 100, those of skill in the art will appreciate that the method (or other methods described in the detailed description) could be carried out by another entity—for example, by system 102, an ECU of system 102 such as TBC ECU 120, or any combination of these or other entities.

As shown in FIG. 5, a method 500 begins at step 502 with vehicle 100, during ignition-on cycle 430, operating trailer brake output circuit 122 according to trailer profile 302. In the embodiment of FIG. 5, ignition-on cycle 430 may at times be referred to as a "first" ignition-on cycle, and other ignition-on cycles may be referred to as "initial" ignition-on cycles. However, these references should not be understood to imply any particular order of ignition-on cycles unless explicitly stated. In some embodiments, trailer brake output circuit 122 may be operated according to a trailer profile other than trailer profile 302. Operating the trailer brake output circuit at step 502 could include setting trailer-operation flag 232.

In an embodiment, vehicle 100 receives a trailer configuration via user interface 132 during first ignition-on cycle 430. The trailer configuration could include a new trailer profile not stored in data storage 204 and/or a selection of a trailer profile from among trailer profiles 230 stored in the data storage, as examples. For instance, vehicle 100 could present a request for a trailer configuration via user interface 132 during first ignition-on cycle 430, and could receive a trailer configuration associated with the request. In such an embodiment, operating trailer brake output circuit 122 at step 502 includes operating the trailer brake output circuit based on the received trailer configuration (e.g., based on the received trailer configuration associated with the request).

In an embodiment, presenting the request for a trailer configuration includes presenting a request for a selection of a trailer profile from among trailer profiles 230 stored in a data storage of vehicle 100 (such as data storage 204 of TBC ECU 120, among other possibilities). For instance, trailer profile 302 may already have been received via user interface 132 and stored in the data storage. In such an embodiment, receiving a trailer configuration includes receiving a selection of stored trailer profile 302, and operating trailer brake output circuit 122 based on a received trailer configuration includes operating the trailer brake output circuit according to the stored trailer profile. Vehicle 100 could present respective identifiers of stored profiles 230 and could present a request for a selection of a trailer profile from among the stored trailer profiles.

In another embodiment, receiving the trailer configuration includes receiving a new trailer profile that is not among trailer profiles 230 stored in a data storage of vehicle 100, and storing the received new trailer profile in the data storage. In such an embodiment, operating trailer brake output circuit 122 based on the received trailer configuration includes operating the trailer brake output circuit according to the new trailer profile stored in the data storage.

Figure 6:
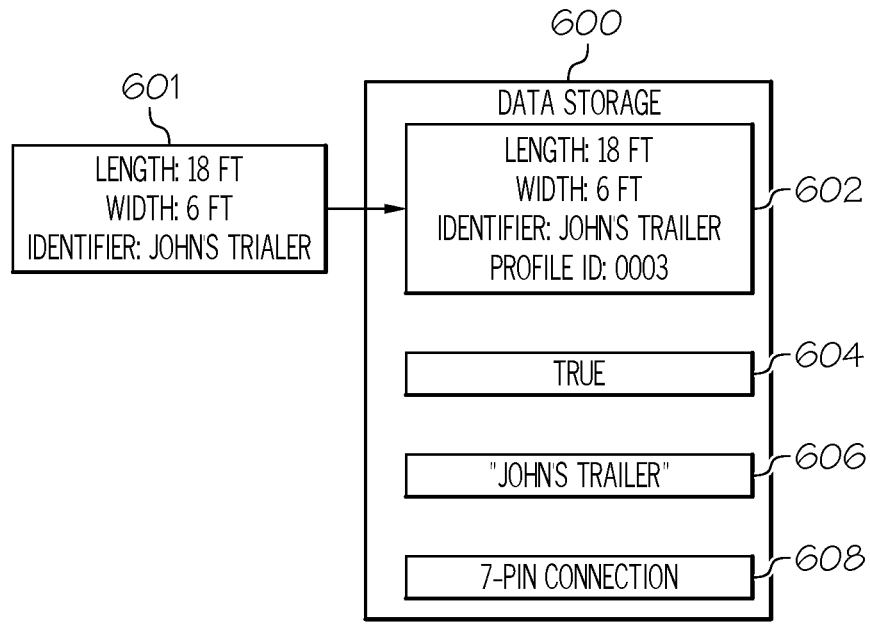
FIG. 6 depicts an example data storage that stores data used by a vehicle when performing the method depicted in FIG. 5, according to one or more embodiments described and illustrated herein.

FIG. 6 depicts an example data storage that stores various data used by vehicle 100 when performing method 500, according to one or more embodiments described and illustrated herein. In the embodiment of FIG. 6, vehicle 100 receives new trailer profile 601 that is not (yet) among trailer profiles 230 stored in a data storage 600 of vehicle 100 (such as a data storage 204 of ECU 200). The vehicle stores the new trailer profile in data storage 600 as trailer profile 602. In this embodiment, operating trailer brake output circuit 122 based on a received new trailer configuration includes operating the trailer brake output circuit according to trailer profile 602 stored in data storage 600, and includes setting a trailer-operation flag 604 stored in data storage 600 to TRUE.

Additionally, in the embodiment of FIG. 6, operating trailer brake output circuit 122 according to trailer profile 602 includes storing a cycle profile identifier 606 that identifies the given trailer profile. For instance, if vehicle 100 receives a new profile that is not stored in the data storage, then the vehicle could generate an identifier for the new profile or could receive an identifier for the new profile via the user interface. The vehicle could then store the generated or received identifier as cycle profile identifier 326. In the embodiment of FIG. 6, vehicle 100 generates a new profile identifier of "John's Trailer" for trailer profile 602 and stores the generated profile identifier to a data storage of the vehicle as cycle profile identifier 606.

Further, in the embodiment of FIG. 6, during first ignition-on cycle 430, vehicle 100 makes a determination that trailer brake output circuit 122 is electrically coupled to trailer brakes 152 of trailer 150 via a 7-pin connection. In response to making the determination, vehicle 100 stores an identifier of a "7-pin connection" associated with a 7-pin connection type to data storage 600 as connection-type indicator 608.

Presenting a request for a trailer configuration during first ignition-on cycle 430 may include making a determination that a trailer is coupled to vehicle 100 and presenting the request for the trailer configuration in response to making the determination. In an embodiment, vehicle 100 makes a determination during first ignition-on cycle 430 that trailer brake output circuit 122 was not operated during ignition-on cycle 420 preceding first ignition-on cycle 430. Making the determination could involve, for instance, making a determination that trailer-operation flag 232 is not set, that cycle profile identifier 234 is set to NONE, or that connection-type indicator 236 is set to NO CONNECTION, as examples. In such an embodiment, presenting the request for the trailer configuration includes presenting the request in response to making both a determination that a trailer is coupled to vehicle 100 and the determination that the trailer brake output circuit was not operated during ignition-on cycle 420 preceding first ignition-on cycle 430. The determination that a trailer is coupled to vehicle 100 could include a determination that the trailer brake output circuit is electrically coupled to trailer brakes of a trailer via a 7-pin connection, and making the determination that the trailer brake output circuit was not operated during ignition-on cycle 420 may include a determination that the trailer brake output circuit was not electrically coupled to trailer brakes of a trailer via a 7-pin connection during first ignition-on cycle 430.

Referring back to FIG. 4, method 500 continues at step 504 with vehicle 100, during ignition-on cycle 440, making a query-presentation determination including a determination that trailer brake output circuit 122 was operated during first ignition-on cycle 430 preceding ignition-on cycle 440. In the embodiment of FIG. 5, ignition-on cycle 440 may at times be referred to as a second ignition-on cycle. At step 506, vehicle 100, in response to making the query-presentation determination at step 504, presents a query via user interface 132 of the vehicle. The presented query includes a query whether to operate trailer brake output circuit 122 according to a previously-used trailer profile according to which the trailer brake output circuit was operated during first ignition-on cycle 430 preceding second ignition-on cycle 440.

Figure 7:
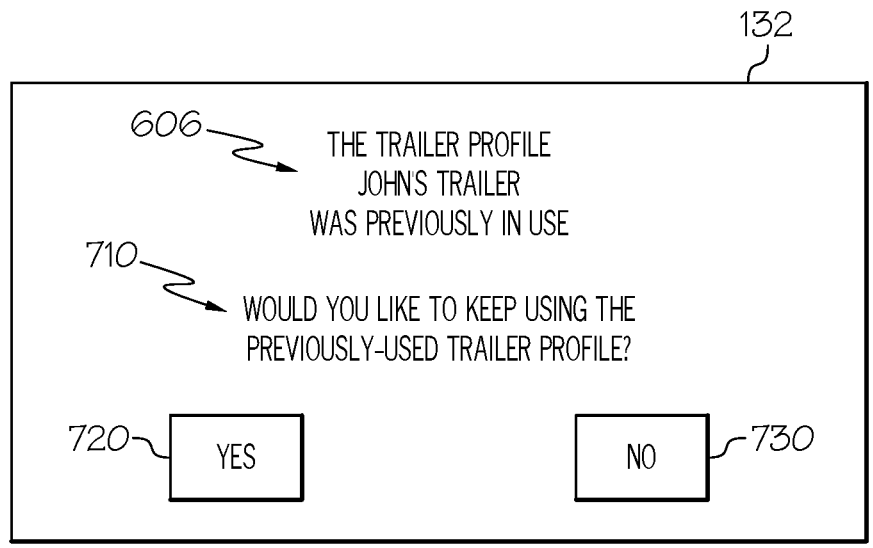
FIG. 7 depicts a query presented via a user interface of a vehicle, according to one or more embodiments described and illustrated herein.

FIG. 7 depicts a query, presented via a user interface of vehicle 100, whether to operate trailer brake output circuit 122 according to a previously-used trailer profile according to which trailer brake output circuit 122 was operated during first ignition-on cycle 430 preceding second ignition-on cycle 440, according to one or more embodiments described and illustrated herein. As shown, user interface 132 presents a query 710 asking "Would you like to keep using the previously-used trailer profile?" In some embodiments, presenting the query includes presenting an identifier, stored in a data storage, of the previously-used trailer profile. For instance, presenting the query may include presenting cycle profile identifier 606 of previously-used trailer profile 602. In the illustrated embodiment, cycle profile identifier 606 is "John's Trailer," and vehicle 100 presents cycle profile identifier 606 by presenting an indication that "The trailer profile 'John's Trailer' was previously in use."

Making the query-presentation determination at step 506 may further involve making a determination that a trailer is coupled to the vehicle—for instance, by making a determination that trailer brake output circuit 122 is electrically coupled to trailer brakes 152 via a 7-pin connection. Additionally or alternatively, making the query-presentation determination may further include making a determination that trailer-operation flag 232 is set.

In an example, vehicle 100 may make both a first determination that trailer brake output circuit 122 is connected to trailer brakes 152 via a 7-pin connection, and a second determination that the trailer brake output circuit was electrically coupled to trailer brakes of a trailer via a 7-pin connection during first ignition cycle 430. Making the second determination could include making a determination that connection-type indicator 236 indicates that the trailer brakes were coupled via a 7-pin connection—for instance, by making a determination that a 7-pin connection flag is set. In this example, if vehicle 100 fails to make both determinations, then vehicle 100 does not make the query-presentation determination and a query is not presented.

As another example, making the determination that the trailer is coupled to the vehicle may include making a first determination that the trailer brake output circuit is not electrically coupled to trailer brakes via a 7-pin connection, and making a second determination that the trailer brake output circuit was not electrically coupled to trailer brakes 152 via a 7-pin connection during first ignition-on cycle 430. In this example, if vehicle 100 determines that the circuit is electrically coupled via a 7-pin connection but does not determine that the circuit was coupled via a 7-pin during first ignition-on cycle, then vehicle 100 does not make the query-presentation determination and a query is not presented. Likewise, during the second ignition-on cycle, if the vehicle determines that the circuit was coupled via a 7-pin connection during the first ignition-on cycle, but does not determine that the circuit is electrically coupled via a 7-pin connection when making the query-presentation determination, then the vehicle does not make the query-presentation determination and a query is not presented.

Referring to method 500 of FIG. 5, at step 508, vehicle 100 receives a reply associated with the query presented via user interface 132 at step 506, and at step 510, the vehicle responsively operates trailer brake output circuit 122 based on the reply. For instance, the reply could include an instruction to operate trailer brake output circuit 122 according to the previously-used trailer profile according to which trailer brake output circuit 122 was operated during the first ignition-on cycle 430 preceding second-on ignition-on cycle 440. In such an embodiment, operating trailer brake output circuit 122 based on the reply includes operating trailer brake output circuit 122 according to the previous-used trailer profile (which could be, e.g., trailer profile 302 according to which trailer brake output circuit 122 was operated during ignition-on cycle 430). Operating trailer brake output circuit 122 according to the previously-used trailer profile could include operating trailer brake output circuit 122 according to a trailer profile having an associated identifier equal to cycle profile identifier 234.

An example is described with reference to FIG. 6. In the example, vehicle 100 receives an instruction associated with query 710 to operate trailer brake output circuit 122 according to the previously-used trailer profile according to which the trailer brake output circuit was operated during first ignition-on cycle 430—in other words, trailer profile 602 which is identified by cycle profile identifier 606 in the form of "John's Trailer" presented in the query. Receiving the instruction could include the vehicle detecting a selection of a user-interface element associated with the instruction. For instance, in the embodiment of FIG. 7, vehicle 100 presents (via user interface 132) user-interface element 720 associated with an instruction to operate trailer brake output circuit 122 according to the trailer profile identified by cycle profile identifier 606 (in this example, trailer profile 602 associated with cycle profile identifier 234). Receiving the instruction to operate trailer brake output circuit 122 according to the previously-used trailer profile includes detecting a selection of user-interface element 720 (shown as "Yes" in FIG. 7) via user interface 132, and operating trailer brake output circuit 122 based on the reply includes operating trailer brake output circuit 122 according to the previously-used trailer profile (trailer profile 602 in this example). As shown, vehicle 100 may also present (via user interface 132) user-interface element 730 associated with an instruction to not operate trailer brake output circuit 122 according to the trailer profile identified by cycle profile identifier 606.

Figure 8:
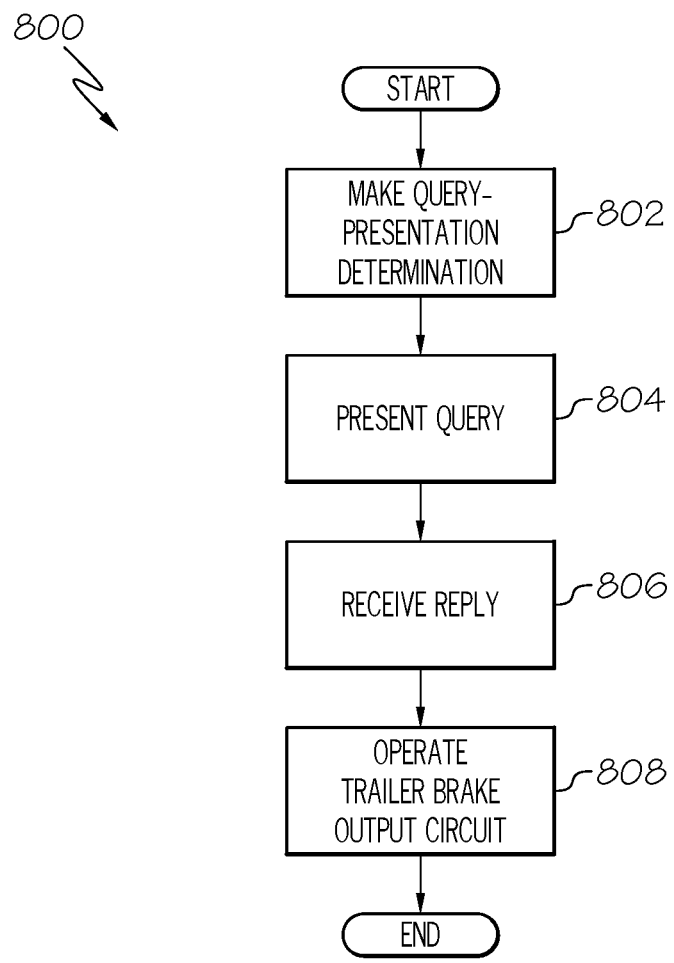
FIG. 8 depicts a flowchart of a method, according to one or more embodiments described and illustrated herein.

FIG. 8 depicts a flowchart of a method, according to one or more embodiments described and illustrated herein. As shown, a method 800 begins at step 802 with vehicle 100 (and/or one or more components of vehicle 100, as described above) making a query-presentation determination, during ignition-on cycle 440, that trailer brake output circuit 122 was operated during ignition-on cycle 430 preceding ignition-on cycle 440. The vehicle may make the query-presentation determination in the manner described above with reference to step 504 of method 500, for example.

The method continues at step 804 with vehicle 100, in response to making the query-presentation determination at step 802, presenting a query via user interface 132 whether to operate trailer brake output circuit 122 according to a previously-used trailer profile according to which the trailer brake output circuit was operated during ignition-on cycle 430 preceding ignition-on cycle 440. The vehicle may present the query in a similar manner to that described above with reference to step 506 of method 500, for example. At step 806 of method 800, vehicle 100 receives a reply associated with the query presented via user interface 132 at step 804, and at step 808, the vehicle responsively operates trailer brake output circuit 122 based on the reply received at step 806. The vehicle may receive the reply and operate the trailer brake output circuit in a similar manner to that described above with reference to steps 508 and 510.

Figure 9:
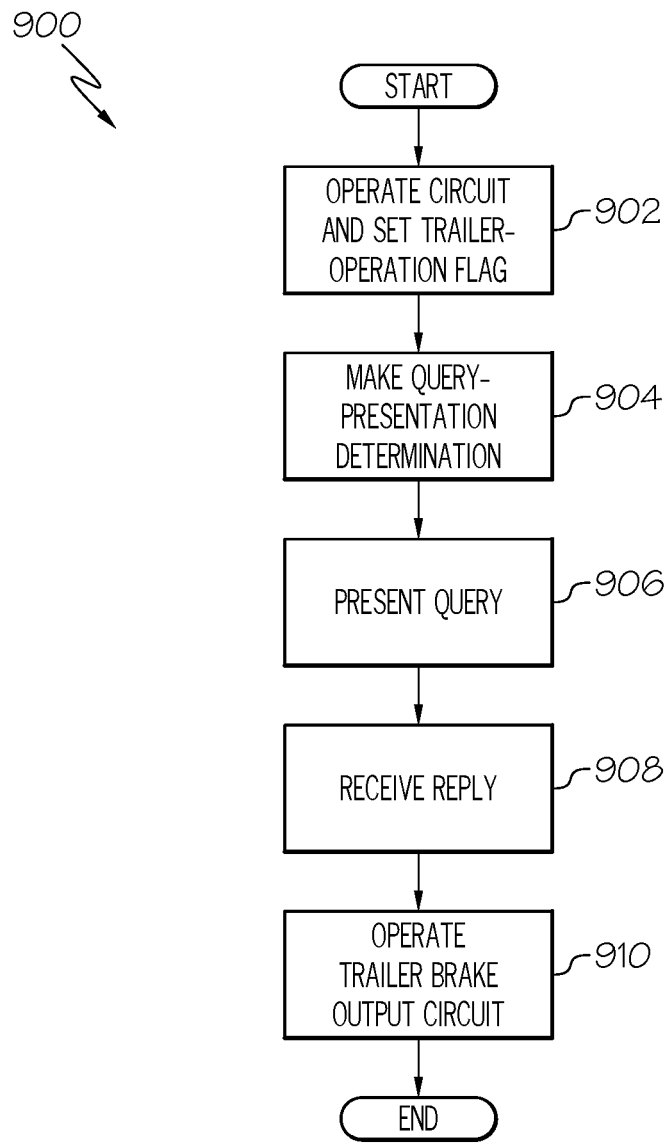
FIG. 9 depicts a flowchart of a method, according to one or more embodiments described and illustrated herein.

FIG. 9 also depicts a flowchart of a method carried out by vehicle 100, a component of vehicle 100, or any combination of these, according to one or more embodiments described and illustrated herein. As shown, a method 900 begins at step 902 with vehicle 100, during ignition-on cycle 430 preceding ignition-on cycle 440, operating trailer brake output circuit 122 and setting trailer-operation flag 232. At step 904, during ignition-on cycle 440, vehicle 100 makes a query-presentation determination that trailer-operation flag 232 is set. Also during ignition-on cycle 440, in response to making the determination at step 904, vehicle 100 presents a query via user interface 132 at step 906 whether to operate trailer brake output circuit 122 according to a previously-used trailer profile according to which the trailer brake output circuit was operated during ignition-on cycle 430 preceding ignition-on cycle 440. At step 908, vehicle 100 receives a reply associated with the query presented at step 906, and at step 910, the vehicle responsively operates trailer brake output circuit 122 based on the reply received at step 908. Additional aspects of these steps are described throughout the detailed description.

It should now be understood that one or more embodiments described herein are directed to vehicles, vehicle control systems, electronic control units (ECUs), and methods carried out by ECUs for operating a trailer brake output circuit according to a trailer profile. In some embodiments, a vehicle makes a query-presentation determination during a second ignition-on cycle of the vehicle. The query-presentation determination includes a determination that a trailer brake output circuit of the vehicle was operated during a first ignition-on cycle of the vehicle preceding the second ignition-on cycle. In response to making the query-presentation determination, the vehicle presents a query via a user interface of the vehicle whether to operate the trailer brake output circuit according to a previously-used trailer profile according to which the trailer brake output circuit was operated during the first ignition-on cycle preceding the second ignition-on cycle. The vehicle receives a reply, associated with the query, via the user interface, and the vehicle operates the trailer brake output circuit based on the received reply in response to receiving the reply. By presenting a driver with a query whether to operate the trailer brake output circuit according to a previously-used trailer profile, the driver may instruct the vehicle to re-use the previously-used trailer profile, perhaps without the need to navigate a menu system (via the user interface) to select the previously-used profile from a list of one or more profiles saved to a data storage of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   making a query-presentation determination during a second ignition-on cycle of a vehicle, the query-presentation determination comprising a determination that a trailer brake output circuit of the vehicle was operated during a first ignition-on cycle of the vehicle preceding the second ignition-on cycle;
   in response to making the query-presentation determination, presenting a query via a user interface of the vehicle whether to operate the trailer brake output circuit according to a previously-used trailer profile according to which the trailer brake output circuit was operated during the first ignition-on cycle preceding the second ignition-on cycle;
   receiving a reply, associated with the query, via the user interface; and
   in response to receiving the reply, operating the trailer brake output circuit based on the received reply.

2. The method of claim 1,
   wherein making the query-presentation determination further comprises making a determination that a trailer is coupled to the vehicle.

3. The method of claim 2,
   wherein making the determination that a trailer is coupled to the vehicle comprises making a determination that the trailer brake output circuit is electrically coupled to trailer brakes of the trailer via a 7-pin connection.

4. The method of claim 3,
   wherein making the query-presentation determination further comprises making a determination that the trailer brake output circuit was electrically coupled to trailer brakes of a trailer via a 7-pin connection during the first ignition-on cycle.

5. The method of claim 1,
   wherein making the query-presentation determination further comprises:

making a determination that the trailer brake output circuit was not electrically coupled to trailer brakes via a 7-pin connection during the first ignition-on cycle; and making a determination that the trailer brake output circuit is not electrically coupled to trailer brakes via a 7-pin connection.

6. The method of claim 1, wherein the reply comprises an instruction to operate the trailer brake output circuit according to the previously-used trailer profile, and wherein operating the trailer brake output circuit based on the reply comprises operating the trailer brake output circuit according to the previously-used trailer profile.

7. The method of claim 1, further comprising:

during the first ignition-on cycle, operating the trailer brake output circuit according to a first-cycle trailer profile, wherein the previously-used trailer profile comprises the first-cycle trailer profile.

8. The method of claim 7, further comprising:

receiving a trailer configuration via the user interface during the first ignition-on cycle, wherein operating the trailer brake output circuit according to the first-cycle trailer profile comprises operating the trailer brake output circuit based on the received trailer configuration.

9. The method of claim 8, further comprising:

during the first ignition-on cycle, presenting a request via the user interface for a trailer configuration, wherein the received trailer configuration is associated with the request.

10. The method of claim 9, further comprising:

during the first ignition-on cycle, making a first-cycle determination that a trailer is coupled to the vehicle and that the trailer brake output circuit was not operated during an initial ignition-on cycle of the vehicle preceding the first ignition-on cycle, wherein presenting the request for a trailer configuration comprises presenting the request in response to making the first-cycle determination.

11. The method of claim 10, wherein making the determination that a trailer is coupled to the vehicle comprises making a determination that the trailer brake output circuit is electrically coupled to trailer brakes of a trailer via a 7-pin connection, and wherein making the determination that the trailer brake output circuit was not operated during the initial ignition-on cycle comprises making a determination that the trailer brake output circuit was not electrically coupled to trailer brakes of a trailer via a 7-pin connection during the initial ignition-on cycle.

12. The method of claim 9, wherein presenting the request for a trailer configuration comprises presenting respective identifiers for one or more trailer profiles stored in a data storage of the vehicle and presenting a request for a selection of a trailer profile from among the stored trailer profiles, wherein receiving the trailer configuration comprises receiving a selection of a stored trailer profile from among the stored trailer profile, and wherein operating the trailer brake output circuit based on the received trailer configuration comprises operating the trailer brake output circuit according to the stored trailer profile.

13. The method of claim 8, wherein receiving the trailer configuration comprises:

receiving a new trailer profile that is not among one or more trailer profiles stored in a data storage of the vehicle; and storing the new trailer profile in the data storage, and wherein operating the trailer brake output circuit based on the received trailer configuration comprises operating the trailer brake output circuit according to the new trailer profile stored in the data storage.

14. A vehicle control system of a vehicle, the vehicle control system having a user interface and an electronic control unit (ECU), the ECU comprising:

a processor; and a non-transitory computer-readable storage medium comprising instructions that, when executed by the processor, cause the ECU to:

operate a trailer brake output circuit during a first ignition-on cycle of the vehicle;

make a query-presentation determination during a second ignition-on cycle of the vehicle, the query-presentation determination comprising a determination that the trailer brake output circuit was operated during the first ignition-on cycle, wherein the first ignition-on cycle precedes the second ignition-on cycle;

in response to making the query-presentation determination, present a query via the user interface whether to operate the trailer brake output circuit according to a previously-used trailer profile according to which the trailer brake output circuit was operated during the first ignition-on cycle preceding the second ignition-on cycle;

receive, via the user interface, a reply associated with the query; and in response to receiving the reply, operate the trailer brake output circuit based on the received reply.

15. The vehicle control system of claim 14, wherein the reply comprises an instruction to operate the trailer brake output circuit according to the previously-used trailer profile, and wherein the instructions that cause the ECU to operate the trailer brake output circuit based on the reply comprise instructions that cause the ECU to operate the trailer brake output circuit according to the previously-used trailer profile.

16. The vehicle control system of claim 14, wherein the instructions that cause the ECU to make the query-presentation determination comprise instructions that cause the ECU to:

make a determination that the trailer brake output circuit is electrically coupled to trailer brakes of a trailer via a 7-pin connection; and make a determination that the trailer brake output circuit was electrically coupled to trailer brakes of a trailer via a 7-pin connection during the first ignition-on cycle.

17. The vehicle control system of claim 14, wherein the instructions further cause the ECU to present, during the first ignition-on cycle, a request via the user interface for a trailer configuration, and wherein the received trailer configuration is associated with the request.

18. A method comprising:
during a first ignition-on cycle of a vehicle preceding a second ignition-on cycle of the vehicle, operating a trailer brake output circuit of the vehicle and setting a trailer-operation flag;
during the second ignition-on cycle of the vehicle:
making a second-ignition determination that the trailer-operation flag is set; and
in response to making the second-ignition determination, presenting a query via a user interface of the vehicle whether to operate the trailer brake output circuit according to a previously-used trailer profile according to which the trailer brake output circuit was operated during the first ignition-on cycle preceding the second ignition-on cycle; and
receiving a reply, associated with the query, via the user interface and responsively operating the trailer brake output circuit based on the reply.

19. The method of claim 18,
wherein making the second-ignition determination comprises making a determination that a trailer is coupled to the vehicle.

20. The method of claim 18,
wherein the reply comprises an instruction to operate the trailer brake output circuit according to the previously-used trailer profile, and
wherein operating the trailer brake output circuit based on the reply comprises operating the trailer brake output circuit according to the previously-used trailer profile.

* * * * *